US010701905B2

(12) United States Patent
Klein et al.

(10) Patent No.: US 10,701,905 B2
(45) Date of Patent: Jul. 7, 2020

(54) IMAGING AND THREE DIMENSIONAL RECONSTRUCTION FOR WEIGHT ESTIMATION

(71) Applicant: INTERNATIONAL BUSINESS MACHINES CORPORATION, Armonk, NY (US)

(72) Inventors: Levente Klein, Tuckahoe, NY (US); Robin Lougee, Yorktown Heights, NY (US); Fernando J. Marianno, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

(21) Appl. No.: 15/833,594

(22) Filed: Dec. 6, 2017

(65) Prior Publication Data

US 2019/0166801 A1    Jun. 6, 2019

(51) Int. Cl.
*G06K 9/00* (2006.01)
*A01K 29/00* (2006.01)
(Continued)

(52) U.S. Cl.
CPC .......... *A01K 29/00* (2013.01); *A01K 11/006* (2013.01); *G06T 7/0012* (2013.01); *G06T 7/62* (2017.01);
(Continued)

(58) Field of Classification Search
CPC .. A01K 29/005; A01K 1/0613; A01K 11/006; G01G 17/08; G01G 13/24;
(Continued)

(56) References Cited

U.S. PATENT DOCUMENTS 8,659,764 B2   2/2014   Hatzilias et al.
8,787,621 B2   7/2014   Spicola, Sr. et al.
(Continued)

FOREIGN PATENT DOCUMENTS

WO    2010023122 A2   3/2010
WO    2010098954 A2   9/2010
WO    2014026765 A1   2/2014

OTHER PUBLICATIONS

Tillett, R. D., et al. "Extracting morphological data from 3D images of pigs." Proceedings of the international conference on agricultural engineering, AgEng 2004, Leuven, Belgium. 2004. (Year: 2004).*
(Continued)

*Primary Examiner* — Li Liu
(74) *Attorney, Agent, or Firm* — Cantor Colburn LLP; Vazken Alexanian

(57) ABSTRACT

A weighing station device, a computer-implemented method and a computer program product for estimating a weight of an animal. The weighing station device includes a stall for the animal, a camera in the stall that is activated to capture a plurality of digital images of the animal when a presence of the animal is detected at the stall. A processor obtains the plurality of digital images from the camera, constructs a three-dimensional digital image of the animal from the plurality of digital images, determines a dimension of the animal from the three-dimensional digital image, and estimates the weight of the animal from the determined dimension and a model relating the dimension of the animal to the weight of the animal.

19 Claims, 7 Drawing Sheets

(51) Int. Cl.
  *H04N 5/225* (2006.01)
  *G06T 7/62* (2017.01)
  *A01K 11/00* (2006.01)
  *G06T 7/00* (2017.01)
  *H04N 13/282* (2018.01)
  *H04N 5/33* (2006.01)

(52) U.S. Cl.
  CPC ............. *H04N 5/2251* (2013.01); *H04N 5/33* (2013.01); *H04N 13/282* (2018.05); *G06T 2207/10012* (2013.01); *G06T 2207/20081* (2013.01)

(58) Field of Classification Search
  CPC ... G01G 9/00; G06T 2207/10004; G06T 7/62; G01B 11/02; G06K 9/00369
  See application file for complete search history.

(56) References Cited

U.S. PATENT DOCUMENTS

| | | | | |
|---|---|---|---|---|
| 2006/0178579 | A1* | 8/2006 | Haynes | A61B 8/08 600/437 |
| 2010/0289879 | A1* | 11/2010 | Sinzinger | A01K 29/00 348/46 |
| 2011/0196661 | A1* | 8/2011 | Spicola | A01K 29/00 703/11 |
| 2012/0275659 | A1* | 11/2012 | Gomas | G06K 9/6209 382/110 |
| 2013/0064432 | A1* | 3/2013 | Banhazi | G06T 7/60 382/110 |
| 2013/0304446 | A1* | 11/2013 | Rabinovitz | A61B 1/00158 703/11 |
| 2013/0321600 | A1 | 12/2013 | Spicola, Jr. | |
| 2014/0140582 | A1* | 5/2014 | Spicola, Jr. | A01K 29/005 382/110 |
| 2015/0359199 | A1* | 12/2015 | Schaefer | A01K 29/005 382/110 |
| 2015/0359200 | A1* | 12/2015 | Cook | A01K 29/005 382/110 |
| 2016/0012278 | A1* | 1/2016 | Banhazi | A01K 29/00 382/110 |
| 2016/0042038 | A1* | 2/2016 | Schumacher | G06F 16/24575 707/722 |
| 2016/0125276 | A1* | 5/2016 | Spicola, Sr. | A01K 29/005 382/110 |
| 2016/0358342 | A1* | 12/2016 | Garcia | H04N 5/2252 |
| 2017/0124727 | A1* | 5/2017 | Amat Roldan | G01B 21/042 |
| 2019/0087067 | A1* | 3/2019 | Hovden | G06F 16/954 |

OTHER PUBLICATIONS

Tasdemir, Sakir, Abdullah Urkmez, and Seref Inal. "Determination of body measurements on the Holstein cows using digital image analysis and estimation of live weight with regression analysis." Computers and electronics in agriculture 76.2 (2011): 189-197. (Year: 2011).*

Frost, A.R., et al.; "A review of livestock monitoring and the need for integrated systems." Computers and Electronics in Agriculture 17.2 (1997), pp. 139-159.

* cited by examiner

IMAGING AND THREE DIMENSIONAL RECONSTRUCTION FOR WEIGHT ESTIMATION

BACKGROUND

The present invention relates to health and weight estimation systems, and more specifically, to systems and methods for generating a digital image of an animal and analyzing the digital image to generate an estimate of the weight of the animal.

Current weigh estimation methods for animals are based on inexact methods of either visual inspection or manually lifting animals or putting them on a scale where animal separation is difficult and thereby guessing its weight. At farms with hundreds or thousands of animals, there is a need for automatically estimating a weight of an animal.

SUMMARY

Embodiments of the present invention are directed to a computer-implemented method of estimating a weight of an animal, the computer-implemented method including: activating a camera to obtain a three-dimensional digital image of the animal when a presence of the animal is detected at a selected location; determining, using a processor, a dimension of the animal based at least in part on the three-dimensional digital image; estimating, using the processor, the weight of the animal based at least in part on the determined dimension and a model that associates the determined dimension of the animal to the weight of the animal.

In addition, embodiments of the present invention are directed to a weighing station device for estimating a weight of an animal, the device including: a stall for the animal; a camera in the stall that is activated to capture a plurality of digital images of the animal when a presence of the animal is detected at the stall; and a processor configured to: obtain the plurality of digital images of the animal from the camera; construct a three-dimensional digital image of the animal from the plurality of digital images; determine a dimension of the animal from the three-dimensional digital image; and estimate the weight of the animal from the determined dimension and a model relating the dimension of the animal to the weight of the animal.

In addition, embodiments of the present invention are directed to a computer program product for weighing an animal, the computer program product comprising a computer readable storage medium having program instructions embodied therewith, the program instructions executable by a processor to cause the processor to perform: activating a camera to capture a plurality of digital images of the animal obtained at a plurality of locations with respect to the animal when the animal is detected at a stall for the animal; constructing a three-dimensional digital image of the animal from the plurality of digital images; determining a dimension of the animal from the three-dimensional digital image; ranking the weight of all animals based on their dimensions; and estimating the weight of the animal from the determined dimension and a model relating the dimension of the animal to the weight of the animal.

DETAILED DESCRIPTION

Figure 1A:
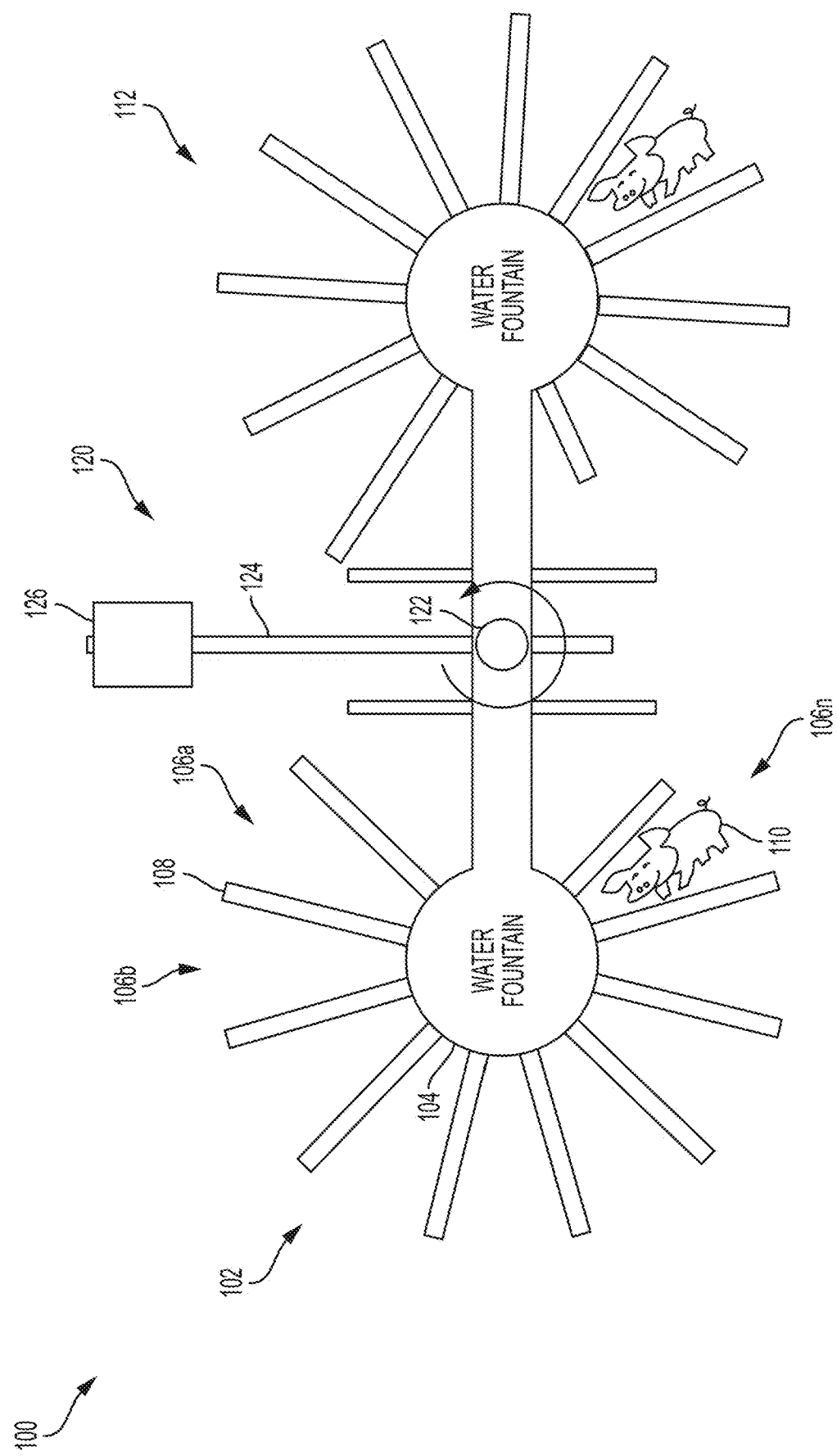
FIG. 1A shows a top view of a weighing station suitable for determining a weight of an animal according to embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment of the invention or design described herein as "exemplary" is not necessarily to be construed as preferred or advantageous over other embodiments or designs. The terms "at least one" and "one or more" can be understood to include any integer number greater than or equal to one, i.e. one, two, three, four, etc. The terms "a plurality" can be understood to include any integer number greater than or equal to two, i.e. two, three, four, five, etc. The term "connection" can include both an indirect "connection" and a direct "connection."

A mechanical scale is often used to weigh an animal, given that the scale is of sufficient size for the animal. However, animals are generally unaware of when they are being weighed and are unaware of the general behaviors expected in order to be weighed, such as remaining motionless for an extended amount of time. Therefore, it is difficult to weigh animals using mechanical scales. Additionally, scales are eventually muddied and require periodic scale calibration and/or repair due to continual contact with the animal.

Turning now to an overview of technologies that are more specifically relevant to aspects of the invention, a weighing station device estimates a weight of an animal without the use of mechanical scales. The device includes a stall for the animal and a camera in the stall for obtaining a plurality of digital images of the animal. A processor obtains the plurality of digital images of the animal from the camera and constructs a three-dimensional digital image of the animal from the plurality of digital images. The processor determine a dimension of the animal from the three-dimensional digital image and estimates the weight of the animal from the determined dimension and a model relating the dimension of the animal to the weight of the animal. By avoiding contact with the animal, the weight station avoids or reduces the need for periodic calibration that comes with the use of scales. The weighing station can further determine the quality of the digital images and select only those that are sufficiently unobstructed in order to create the three-dimensional digital image, thereby improving the three-dimensional image by including only suitable digital images in the construction of the three-dimensional image.

FIG. 1A shows a top view of a weighing station 100 suitable for determining a weight of an animal 110 according to embodiments of the invention. The weighing 100 station includes one or more feeding stations 102 and 112 for feeding the animal 110. Feeding station 102 includes a central feeding hub 104 with stalls 106a, . . . , 106n circumferentially arranged around the feeding hub 104. The stalls 106a, . . . , 1006n have widths that can be adjusted so that only one animal can fit in the stall at a time. The feeding hub 104 can provide food or can be a water dispenser in various embodiments of the invention. Each stall 106a, . . . , 106n is defined by transparent walls 108 that cordons off an area of the stall in order to allow only a single animal 110 into the stall at a time. Animal 110 is shown in stall 106n for illustrative purposes. Each stall can be labelled for identification purposes. Additionally, the animal 110 can carry a personal identification system on its body. In an illustrative example, the animal 110 can include a radio frequency identification (RFID) chip embedded within to help identify the animal 110 in the individual stall. The RFID chip can associate the animal to a genotype or breed type of the specified animal that is stored in a database. The stall can include an RFID detector that detects the RFID chip when the animal 110 enters the stall. Feeding station 112 is equipped similar to feeding station 102.

The weighing station 100 further includes a camera system 120 that is used in concert with the feeding stations 102 and 112 in order to obtain a plurality of digital images of the animal 110 while it is feeding. The camera system 120 includes a vertical pole 122 and a horizontal beam 124 slidingly connected to the vertical pole 122. A camera assembly 126 is slidably disposed on the horizontal beam 124 in order to capture and store digital images of the animal 110.

Figure 1B:
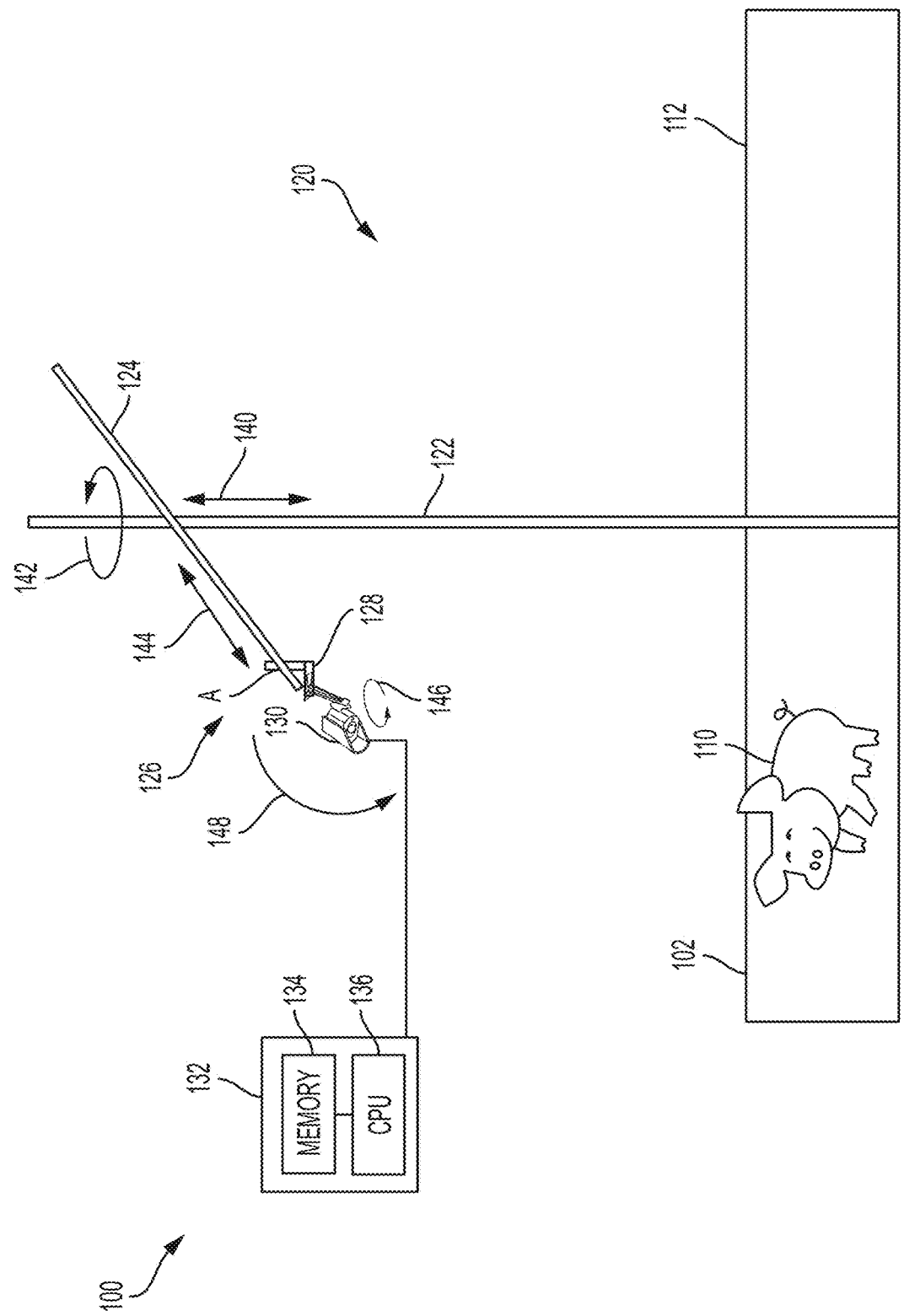
FIG. 1B shows a side view of the weighing station of FIG. 1A.

FIG. 1B shows a side view of the weighing station 100 of FIG. 1A. Animal 110 is shown disposed in a stall of feeding station 102. The vertical pole 122 of the camera system extends up above the stalls to a selected height. A horizontal beam 124 is slidingly connected to the vertical pole 122 and is able to slide up and down the vertical pole 122 (as indicated by arrow 140) as well as to rotate within a horizontal plane around the vertical pole 122 (as indicated by rotational arrow 142). Camera assembly 126 is slidably connected to the horizontal beam 124 in order to slide towards or away from the vertical pole 122 (as indicated by arrow 144). This configuration allows the camera assembly 126 to be rotated to and located at selected positions for capturing digital images of animals in any of the selected stalls 106a, . . . , 106n. The camera assembly 126 includes a gimbal 128 supported by the horizontal beam 124 at a point of attachment A. Camera 130 is supported in the gimbal 128. The gimbal 128 and horizontal beam 124 control motion of the camera 130 with respect to animal 110. The gimbal 128 moves the camera 130 in a horizontal plane in a circle around on the point of attachment A (as indicated by rotational arrow 146) and also allows the camera 130 to tilt upwards and downward with respect to the horizontal plane (as indicated by rotational arrow 148). When the animal 110 walks into a stall, the RFID detector associated with the stall can detect the RFID chip and activate the camera system 120 to capture and store digital images of the animal 110. By remaining at the stall feeding itself, the animal 110 is kept relatively motionless for a sufficient amount of time for the weighing and imaging methods disclosed herein to be performed.

Digital images captured by the camera 130 are sent to a control unit 132 that includes a memory storage device 134 and a processor 136. The memory storage device 134 can include one or more programs that, when executed by a processor 136, can be used to determine a weight of the animal from the plurality of digital images of the animal 110.

Figure 2:
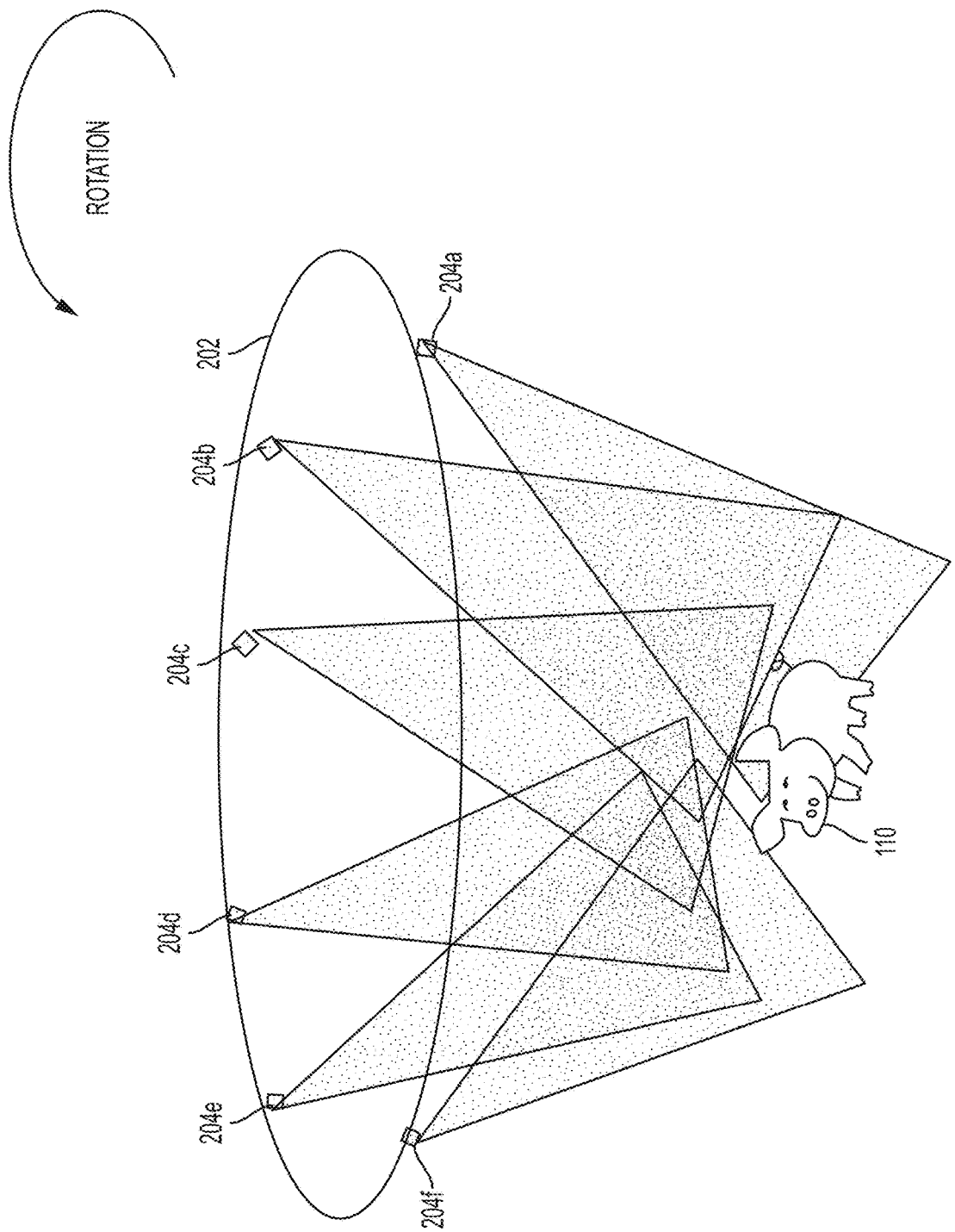
FIG. 2 illustrates an imaging path for a camera for taking digital images of an animal according to embodiments of the invention.

FIG. 2 illustrates an imaging path 202 for a camera for taking digital images of an animal 110 according to embodiments of the invention. The images of the animal 110 can be obtained by first obtaining a field-of-view image with the camera at a suitable height. Using the field-of-view image, the processor 136 estimates a height and length of the animal 110 and determines a suitable camera height and a number of image angles for acquiring a full three-dimensional view of the animal 110 based on the height and length of the animal 110 and other position constraints. The camera of FIG. 2 can then be positioned at a selected height and is moved along path 202 in a horizontal plane to various circumferential locations 204a, . . . , 204f in order to capture and store digital images of the animal 110 at the various circumferential locations 204a, . . . , 204f. The orientation of camera 130 can be altered in order to be directed at the animal 110 for each circumferential location 204a, . . . , 204f. The plurality of digital images are thereby obtained at the plurality of locations 204a, . . . , 204f and the processor 136 forms or constructs a three-dimensional digital image of the animal 110 from the plurality of digital images and determines the size of the animal in all three directions; e.g. height, length, body parts circumferences at various locations. From the three dimensional values a body weight can be calculated based on a model that estimates the weight of various body parts based on the external shape of the animal and assumptions about the body composition based on bone/skin/meat/fat. The camera 130 can capture more than a hundred images per second and can therefore image the animal 110 is 30 seconds or less. The camera 130 can also be used to track a selected animal 110 around the area or farm apart from the stalls.

Figure 3:
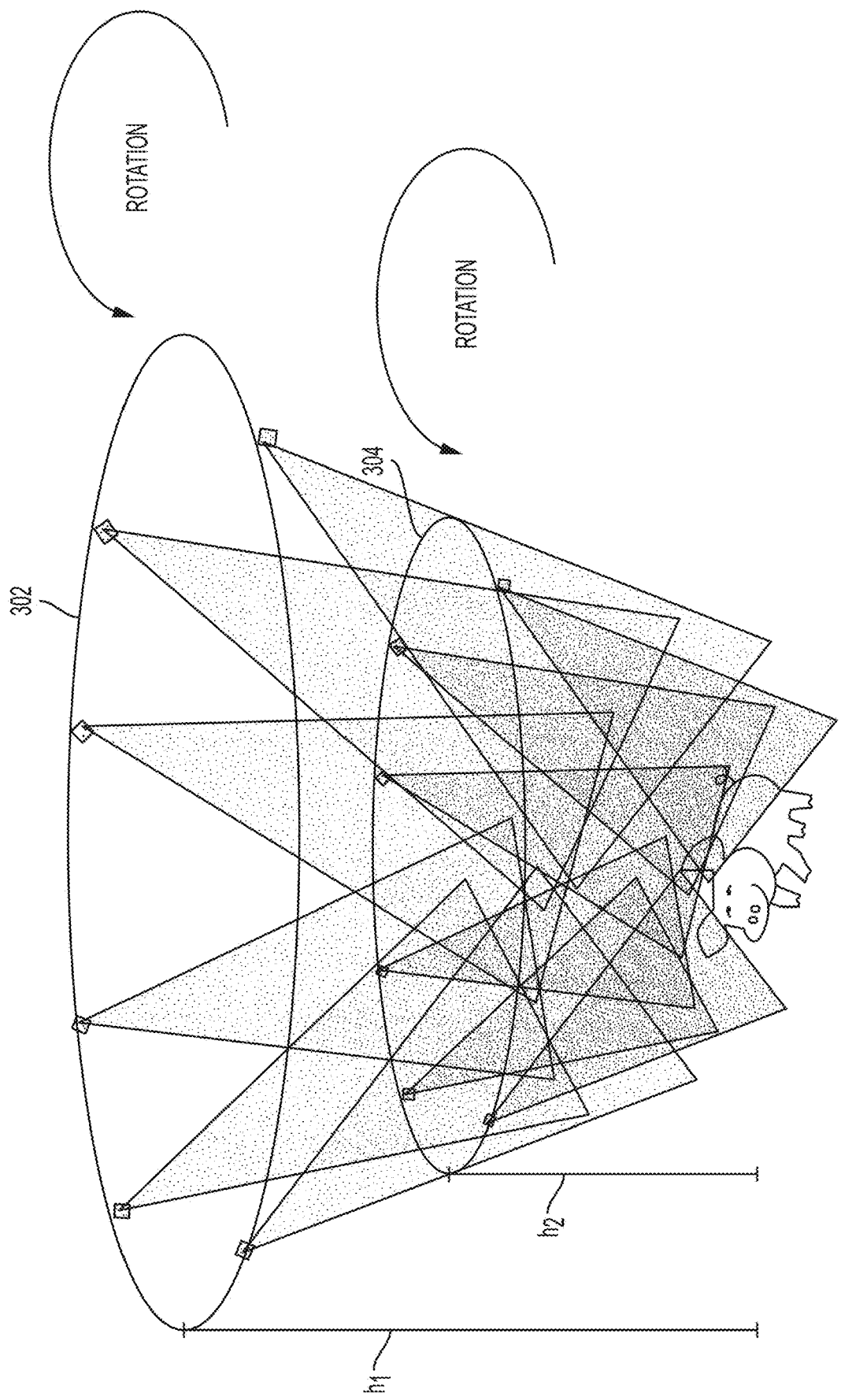
FIG. 3 illustrates an imaging process suitable for obtaining a weight of an animal according to embodiments of the invention.

FIG. 3 illustrates an imaging process suitable for obtaining a weight of an animal according to embodiments of the invention. A first imaging path 302 for the camera is located at a first height $h_1$ above the ground and a second imaging path 304 for the camera is located at a second height $h_2$ above the ground. For example, the first height can be 5 meters above the ground, while the second height can be 0.01 meter above the ground. At each height, the camera 130 is moved in a horizontal plane in a circle along its respective imaging paths 302, 304 and capture digital images of the animal 110 at a plurality of locations along the respective imaging paths 302, 304. Therefore, the camera system 126 can capture digital images under different viewing angles by rotating the horizontal beam 124, gimbal 128 and camera 130. At first height $h_1$, the camera 130 can capture images from above the animal, while at second height $h_2$, the camera 130 can capture images from the sides of or even from below the animal 110. While capturing the digital images, communication between the camera 130 and the processor 136 can determine a level of obstruction of the animal by other objects at the current location of the camera 130. When a camera angle has too much obstruction, for example, more than 20% obstruction of the animal, the camera 130 can skip the step of capturing the digital image at that location, as such a camera angle is of little help in three-dimensional image construction. Alternatively, the camera 130 can capture digital images from all locations and the processor 136 can determine a level of obstruction in the image and discard images having too much obstruction.

Figure 4:
FIG. 4 shows a composite three-dimensional image of the animal formed at the processor using the plurality of images of the animal according to embodiments of the invention.

FIG. 4 shows a composite three-dimensional digital image 400 of the animal 110 formed at the processor 136 using the plurality of digital images obtained of the animal 110. In various embodiments of the invention, the plurality of digital images obtained by the camera are provided to the processor 136. The processor 136 constructs the three-dimensional digital image 400 of the animal 110 from the plurality of digital images. The three-dimensional digital image can be a stereographical three-dimensional reconstruction of the animal 110. The three-dimensional digital image can be used to determine various measurements of the animal 110, such as a length of the animal 110, a circumference of the animal 110, etc. These measurements of the animal 110 can then be compared to a model of the animal 110 that relates or associates the measurements to a weight of the animal 110. Using a pig as an exemplary animal 110, the model can relate or associate a snout-to-tail length of the pig and a circumference of the pig at its center to a specified weight. Information for the model can be obtained by training a machine learning model using known data and specifications. In various embodiments, the models take into account a genetic breed, environmental conditions, age, etc., of the animal. The model, for example, can provide a weight distribution for a selected genetic breed having various measurements. Thus, the weight of the animal can be determined by comparing measured dimensions of the animal to an animal breed having the particular dimensions.

Additionally, the three-dimensional image 400 can be used to spot identifying marks on the skin of the animal 110, as well as any discoloration of the skin that can be an indication of disease, poor nutrition, etc. The image 400 can observe injuries to the animal or body position as an early sign of disease. The camera can also be used as a wide area imaging device in order to track one or more animals are the feeding area or farm.

Figure 5:
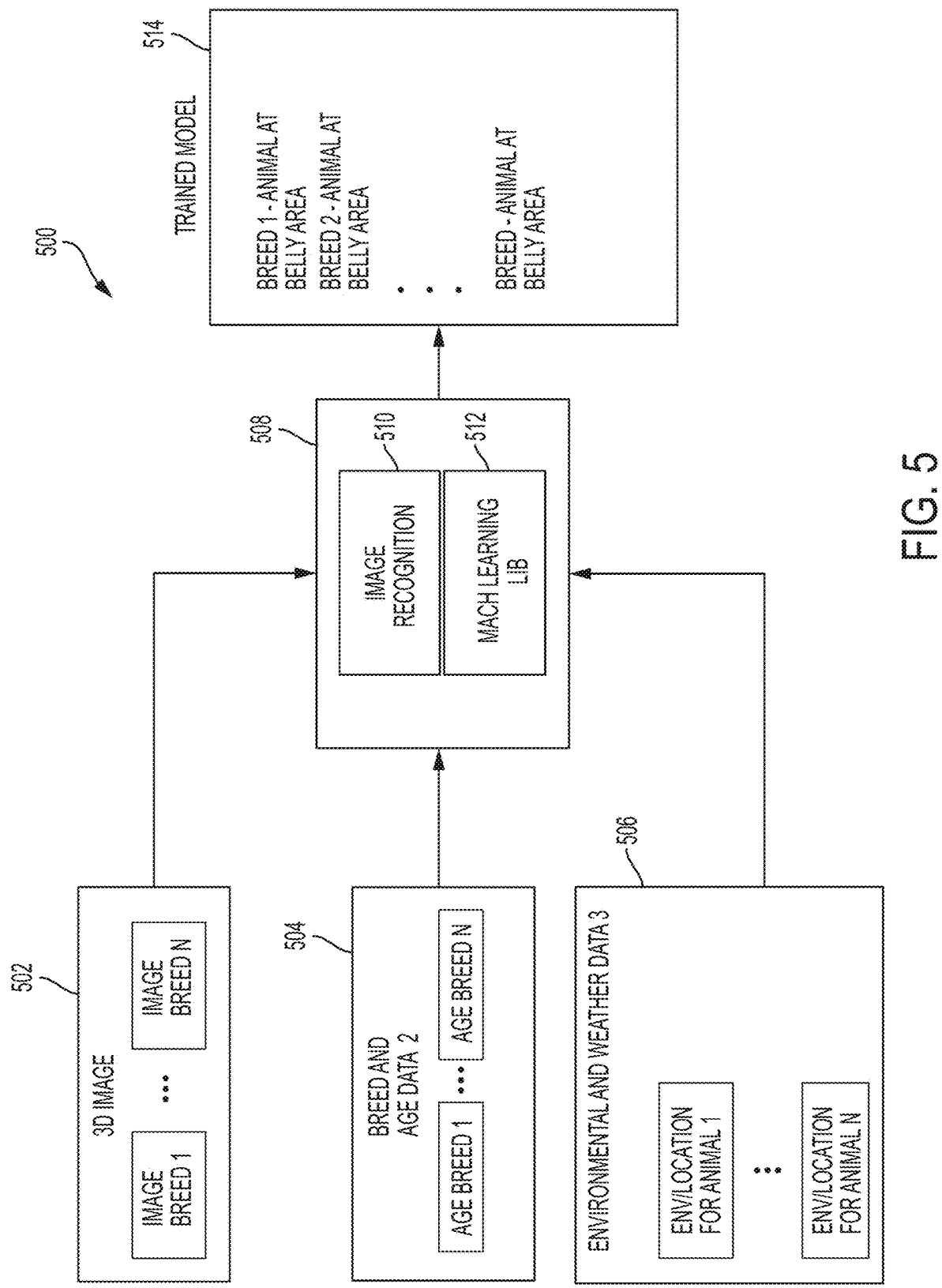
FIG. 5 shows a schematic diagram of a method for training a model that estimates animal weight from three-dimensional images and/or animal dimensions and characteristics obtained from the three-dimensional image according to embodiments of the invention.

FIG. 5 shows a schematic diagram 500 of a method for training a model that estimates animal weight from three-dimensional images and/or dimensions and characteristics of the animal 100 obtained from the three-dimensional image. An untrained model 508 for correlating animal dimensions or characteristics to animal weight is provided to a processor such as processor 136. One or more training data sets 502, 504, 506 are provided to the processor to train the model. In embodiments of the invention, the processor 136 trains the model based on a training data set 502 that provides a plurality of digital images of different breeds (breed 1, breed 2, . . . , breed n) along with their corresponding sizes of body parts and the corresponding weights. Using the data extracted from the digital images of the training data set 502, the processor learns image recognition 510 and builds a machine learning library 512 for the trained model 514.

In other embodiments of the invention, the processor 136 can also receive a training data set 504 that relates or associates breed and age of an animal to weight of the animal. The processor 136 can also a training data set 506 that relates or associates environmental and weather conditions to a weight of the animal. The processor 136 creates the trained model 514 using these additional training data sets 504 and 506. Thus, the trained model 514 can determined the weight of the animal from dimensions of the animal 110 obtained from a three-dimensional image as well as knowledge of a breed and age of the animal as well as of the local environmental or weather conditions.

The model is used to determine a breed that gains weight the fastest under local environmental conditions like weather, feeding, and farming practices. The model can be used to identify the genetics of animal breeds that gain weight fastest within a certain time interval or that has the lowest disease rate, for example.

Figure 6:
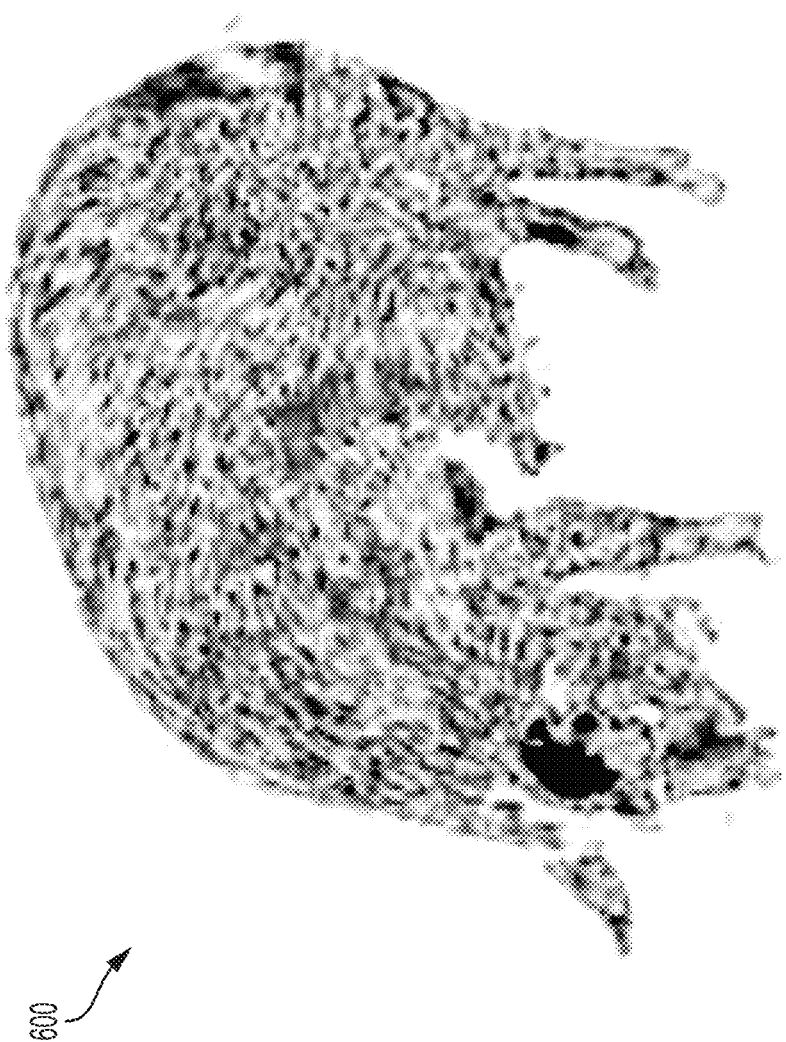
FIG. 6 shows an image obtained of an animal using thermal imaging according to embodiments of the invention.

FIG. 6 shows a digital image obtained of an animal 110 using thermal imaging. Typical cameras used for digital images are responsive to the optical spectrum. However, the camera system can include an infrared camera that tracks changes in the temperature of the animal. The thermal images can be useful to determine the health of animal 110 during different seasons of the year, identify disease or heat stress. Disease or dehydration can be observed as temperature variation across the body of the animal. High heat spots are associated with localized disease or indicator of the body composition, such as a far/meat ratio. Tracking thermal images across time indicates changes the body composition. The thermal camera can be used for a thermal three-dimensional reconstruction of the animal.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of estimating a weight of an animal, the computer-implemented method comprising:
    activating a camera to obtain a three-dimensional digital image of the animal from a plurality of digital images when a presence of the animal is detected at a selected location;
    selecting a set of digital images from the plurality of digital images to construct the three-dimensional digital image based at least in part on a quality of the plurality of digital images,
    wherein selecting the set of digital images comprises:
        obtaining digital images of the animal with the camera at a plurality of locations with respect to the animal;
        determining a level of obstruction at each of the plurality of locations;
        skipping capture of the animal at a current location of the plurality of locations based at least in part on the determined level of obstruction; and
        constructing the three-dimensional digital image of the animal from the plurality of digital images;
    determining, using a processor, a dimension of the animal based at least in part on the set of digital images;

estimating, using the processor, the weight of the animal based at least in part on the determined dimension and a model that associates the determined dimension of the animal to the weight of the animal.

2. The computer-implemented method of claim 1, wherein the model further associates the weight of the animal to a breed of the animal, an age of the animal and environment conditions.

3. The computer-implemented method of claim 1 further comprising training the model to estimate the weight of the animal from a training data set that correlates three-dimensional images and an animal breed to weight.

4. The computer-implemented method of claim 1, wherein the selected location is a stall, further comprising activating the camera when a radio frequency identification (RFID) chip in the animal is detected at an RFID detector in the stall.

5. The computer-implemented method of claim 4, wherein the dimensions of the stall allow for a single animal into the stall at one time.

6. The computer-implemented method of claim 1 further comprising determining a health condition of the animal from a thermal image obtained from the animal.

7. A weighing station device for estimating a weight of an animal, the device comprising:
   a stall for the animal;
   a camera in the stall that is activated to capture a plurality of digital images of the animal when a presence of the animal is detected at the stall; and
   a processor configured to:
      obtain the plurality of digital images of the animal from the camera;
      select a set of digital images from the plurality of digital images to construct a three-dimensional digital image based at least in part on a quality of the plurality of digital images;
      wherein selecting the set of digital images comprises:
         obtain digital images of the animal with the camera at a plurality of locations with respect to the animal;
         determine a level of obstruction at each of the plurality of locations;
         skip capture of the animal at a current location of the plurality of locations based at least in part on the determined level of obstruction; and
         construct the three-dimensional digital image of the animal from the set of digital images;
      determine a dimension of the animal from the three-dimensional digital image that is based at least in part on the set of digital images; and
      estimate the weight of the animal from the determined dimension and a model relating the dimension of the animal to the weight of the animal.

8. The weighing station of claim 7, wherein the model further associates the weight of the animal to a breed of the animal, an age of the animal and environment conditions.

9. The weighing station of claim 7, wherein the camera is movable to a plurality of locations with respect to the animal to obtain digital images of the animal at the plurality of locations.

10. The weighing station of claim 7, wherein the processor is further configured to train the model to estimate the weight of the animal from a training data set that correlates three-dimensional digital images and an animal breed to weight.

11. The weighing station of claim 7, wherein the stall includes a radio frequency identification (RFID) detector and the camera is configured to be activated when a RFID chip in the animal is detected at the RFID detector.

12. The weighing station of claim 7, wherein a dimension of the stall allows a single animal into the stall at one time.

13. The weighing station of claim 7, wherein the camera is further configured to obtain a thermal image from the animal and the processor is further configured to determine a health condition of the animal from the thermal image.

14. A computer program product for weighing an animal, the computer program product comprising a computer readable storage medium having program instructions embodied therewith, the program instructions executable by a processor to cause the processor to perform:
   activating a camera to capture a plurality of digital images of the animal obtained at a plurality of locations with respect to the animal when the animal is detected at a stall for the animal;
   selecting a set of digital images from the plurality of digital images to construct a three-dimensional digital image based at least in part on a quality of the plurality of digital images,
   wherein selecting the set of digital images comprises:
      obtaining digital images of the animal with the camera at the plurality of locations with respect to the animal;
      determining a level of obstruction at each of the plurality of locations;
      skipping capture of the animal at a current location of the plurality of locations based at least in part on the determined level of obstruction; and
   constructing the three-dimensional digital image of the animal from the set of digital images;
   determining a dimension of the animal from the three-dimensional digital image that is based at least in part on the set of digital images;
   ranking the weight of all animals based on their dimensions; and
   estimating the weight of the animal from the determined dimension and a model relating the dimension of the animal to the weight of the animal.

15. The computer program product of claim 14, wherein the model further associates the weight of the animal to a breed of the animal, an age of the animal and an environmental condition.

16. The computer program product of claim 14, further comprising training the model to estimate the weight of the animal from a training data set that correlates three-dimensional digital images and an animal breed to weight.

17. The computer program product of claim 14, further comprising activating the camera when a radio frequency identification (RFID) chip embedded in the animal is brought in proximity of a RFID detector.

18. The computer program product of claim 17, wherein the RFID detector is associated with the stall.

19. The computer program product of claim 18, further comprising obtaining a thermal image from the animal determining a health condition of the animal from the thermal image.

* * * * *